United States Patent [19]
Kainz

[11] Patent Number: 5,372,036
[45] Date of Patent: Dec. 13, 1994

[54] EXHAUST LEAK DETECTION

[75] Inventor: Jeffrey L. Kainz, Romulus, Mich.

[73] Assignee: Ford Motor Company, Dearborn, Mich.

[21] Appl. No.: 155,503

[22] Filed: Nov. 22, 1993

[51] Int. Cl.$^5$ ............................................. G01M 15/00
[52] U.S. Cl. ................................... 73/117.3; 73/46
[58] Field of Search ................. 340/438, 605; 73/116, 73/118.1, 117.3, 23.32, 40.5 R, 40.7, 46, 47, 49.1, 49.7, 49.8

[56] References Cited

U.S. PATENT DOCUMENTS 3,998,095  12/1976  Tinkham et al. ..................... 73/49.7

Primary Examiner—Robert Raevis
Attorney, Agent, or Firm—Peter Abolins; Roger L. May

[57] ABSTRACT

A method of operating an engine detects an exhaust leak from the engine exhaust of an internal combustion engine using engine operating parameters. Signals from an exhaust gas oxygen sensor downstream of a catalyst indicates a leak if the signals are smaller than a predetermined constant.

4 Claims, 5 Drawing Sheets

EXHAUST LEAK DETECTION

FIELD OF THE INVENTION

This invention relates to electronic engine controls for an internal combustion engine.

PRIOR ART

It is known to use an electronic engine control system to control the amount of fuel being introduced into the cylinders of an internal combustion engine. In particular, it is known to use the output of an exhaust gas oxygen (EGO) sensor as part of a feed back control loop to control air/fuel ratio. Further, it is known that it is desirable to have a properly operating exhaust system to avoid certain emissions being introduced into the atmosphere. If an exhaust leak is located upstream of a catalyst in the exhaust system, the vehicle could fail an emissions test. Known techniques of finding such exhaust leaks include visual inspection. It would be desirable to have a diagnostic technique which could be used when exhaust leaks occur during engine operation. In particular it would be desirable to have a method of engine operation which can detect exhaust leaks.

SUMMARY OF THE INVENTION

This invention includes a method for detecting a leak in the engine exhaust path of an internal combustion engine vehicle.

In accordance with an embodiment of this invention, a method of engine operation monitors front and rear heated exhaust gas oxygen sensors and the fuel control logic. The method includes sensing various engine operating parameters. In particular, if a leak is introduced into the exhaust system upstream of the catalyst, the method recognizes the following conditions:

1. the front exhaust gas oxygen sensor intermittently switches rapidly at idle and low engine speed;
2. the rear exhaust gas oxygen sensor switching becomes less frequent and the rear exhaust gas oxygen sensor voltage becomes less as the leak magnitude increases, indicating a lean condition;
3. the amplitude and the frequency of the fuel logic control signal becomes greater as the leak magnitude increases.

DETAILED DESCRIPTION OF THE INVENTION

Figure 1:
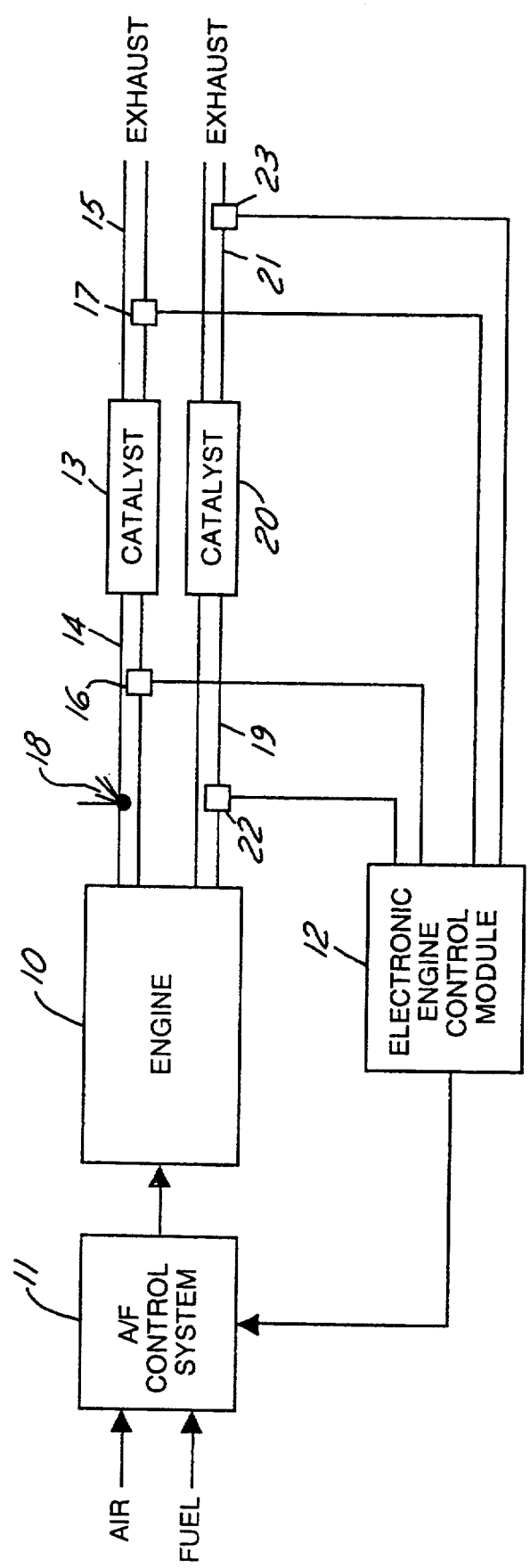
FIG. 1 is a block diagram of an engine control system in accordance with an embodiment of this invention.

A diagnostic strategy, in accordance with an embodiment of this invention, can monitor an exhaust gas oxygen sensor to determine if a leak has occurred upstream of a catalyst in the exhaust system of an internal combustion engine. The method uses measurement of several characteristics of engine operating parameters to determine the state of the engine exhaust. Referring to FIG. 1, an engine 10 receives an air/fuel input mixture from an air/fuel control system 11 which has inputs of air and fuel. Air/fuel control system 11 also receives a control input from an electronic engine control module 12.

The exhaust from engine 10 is applied to a catalyst 13. An exhaust path 14 couples engine 10 to catalyst 13 and an exhaust path 15 conducts the exhaust away from catalyst 13. Exhaust gas oxygen sensor 16 is in exhaust path 14, and an exhaust gas oxygen sensor 17 is in exhaust path 15. A leak 18 is indicated in exhaust path 14. When engine 10 has two banks, such as in a V8 or a V6 engine, there may be dual exhaust paths as indicated whereby an exhaust path 19 goes from engine 10 to a catalyst 20 and an exhaust path 21 carries the exhaust out from catalyst 20. An exhaust gas oxygen sensor 22 is located in exhaust path 19 and an exhaust gas oxygen sensor 23 is located in exhaust path 21.

Figure 2:
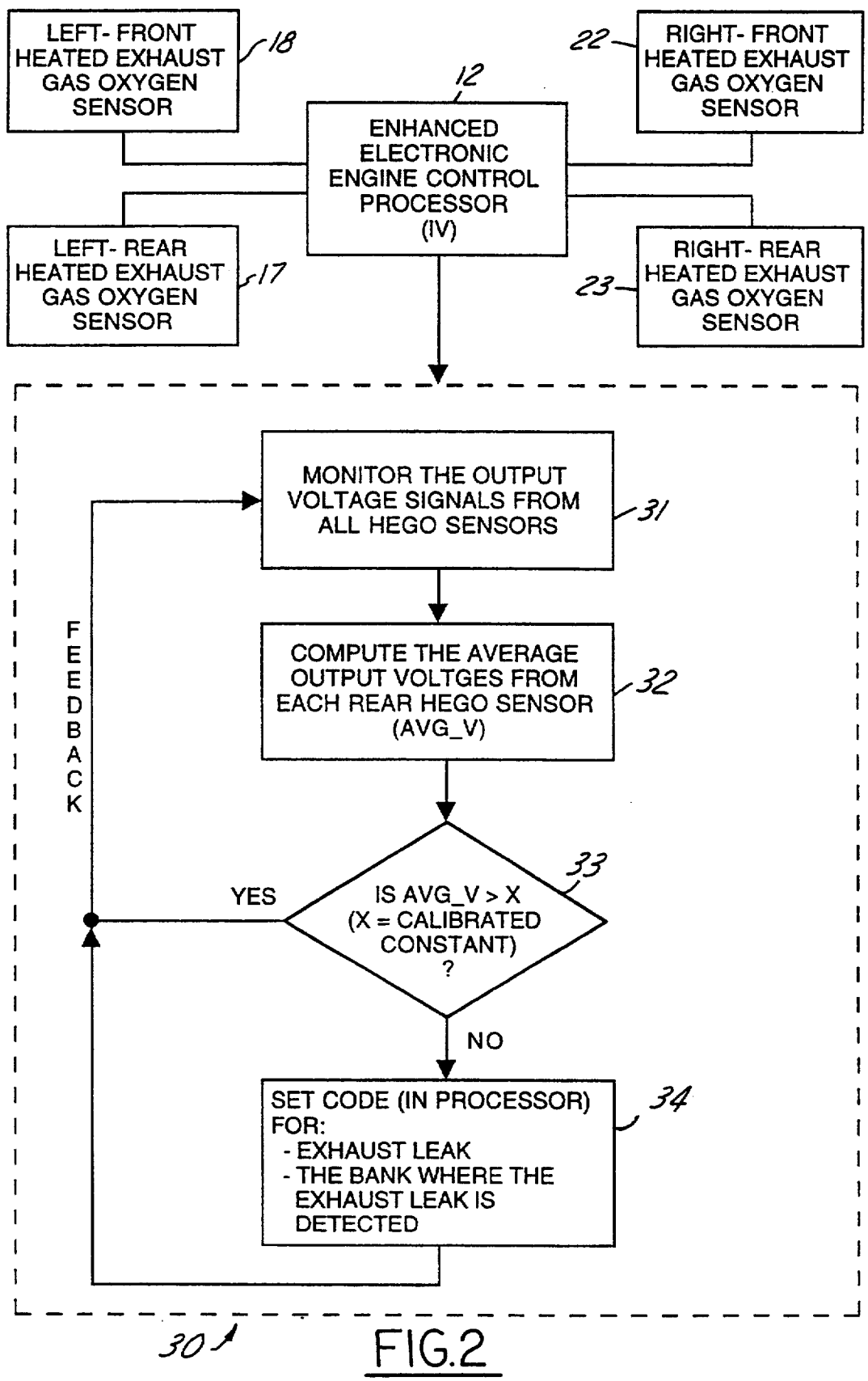
FIG. 2 is a logic flow chart for detecting an exhaust leak in accordance with an embodiment of this invention.

Referring to FIG. 2, engine control module 12 is shown having inputs from exhaust gas oxygen sensors 18, 17, 22, and 23. The logic within the electronic engine control processor 12 is shown within a block 30 which includes a logic flow wherein at a block 31 there is a monitoring of the output of the voltage signals from exhaust gas oxygen sensors 17, 18, 22, 23. Logic flow then goes to a block 32 wherein there is a computation of the average output voltages from each of the rear exhaust gas oxygen sensors producing an average voltage. Logic flow then goes to a decision block 33 wherein it is asked if the average voltage is greater than a calibrated constant, if yes, logic flow goes back to block 31. If no, logic flow goes to a block 34 wherein a code is set in the processor for indicating an exhaust leak and the engine bank where the exhaust leak is detected. The engine bank where the leak is located is the one associated with the rear exhaust gas oxygen sensor indicating a lean condition. Logic flow from block 34 goes back to block 31.

Accordingly, in accordance with this method, the front (16, 22) and rear (17, 23) heated exhaust gas oxygen sensors are monitored and the fuel control logic is monitored. The leak detection algorithm is based upon the action of the following engine operating parameters: 1) the front HEGO sensor intermittently switch rapidly at idle and low engine speeds, 2). the rear HEGO sensor switching becomes less frequent and the HEGO voltage becomes less as the leak size increases, indicating a lean air/fuel ratio condition, 3) the amplitude and the frequency of the fuel logic control signal becomes greater as the leak magnitude increases. Thus the algorithm is able to detect an exhaust leak and which engine bank the leak is on. Upon recognition of the leak, the engine control strategy sets a code and may, if desired, alter its fuel control strategy.

FIG. 3 shows the magnitude of various engine operating parameters versus time of a vehicle with no leaks in the exhaust system. FIG. 4 shows the magnitude of various engine operating parameters versus time of a vehicle with a 3/32 inch orifice located 1.5 inches upstream of the front HEGO sensors on both sides. FIG. 5 shows analogous traces from a vehicle with a 3/16 inch orifice located 1.5 inches upstream of the front HEGO sensors.

Figure 3A:
FIGS. 3A-3H, 4A-4H, and 5A-5H are graphical representations of various engine operating parameters versus time in accordance with an embodiment of this invention.
Figure 3B:
Figure 3C:
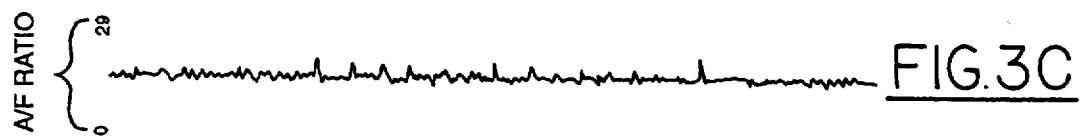
Figure 3D:
Figure 3E:
Figure 3F:
Figure 3G:
Figure 3H:
Figure 4A:
Figure 4B:
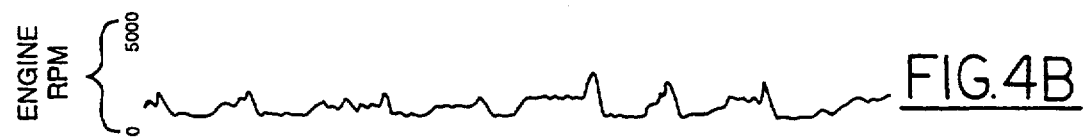
Figure 4C:
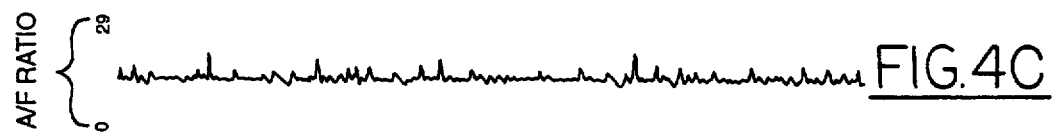
Figure 4D:
Figure 4E:
Figure 4F:
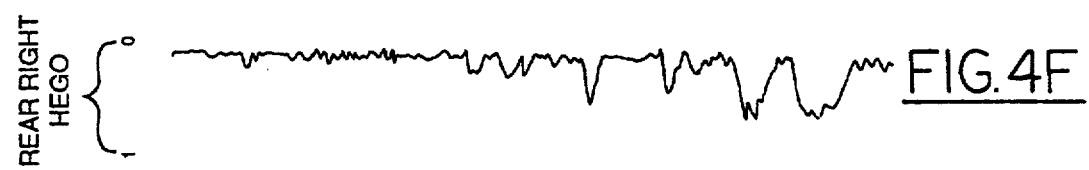
Figure 4G:
Figure 4H:
Figure 5A:
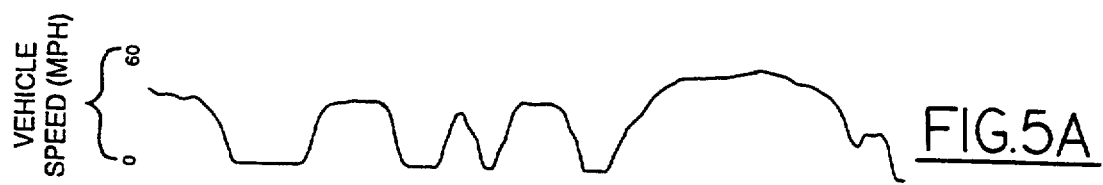
Figure 5B:
Figure 5C:
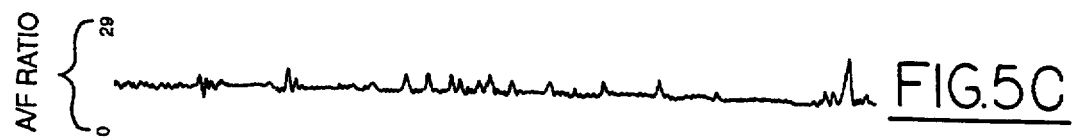
Figure 5D:
Figure 5E:
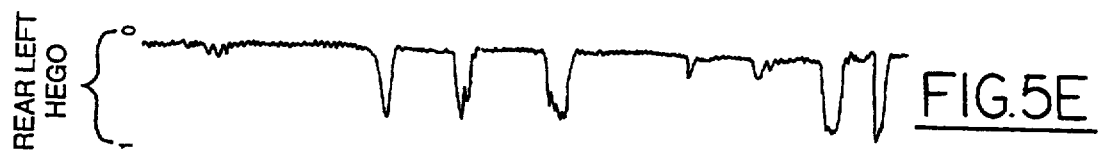
Figure 5F:
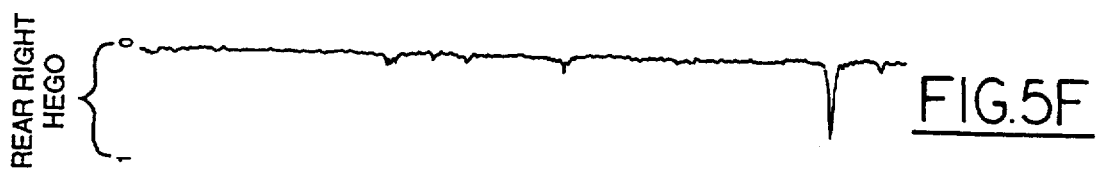
Figure 5G:
Figure 5H:

Note that in FIG. 4E the rear HEGO sensors are tending toward lean, i.e. toward zero voltage (at approximately 0.25 v), when compared with the leak free trace in FIG. 3E where the rear HEGO voltage is approximately 0.6 v. Similarly, in FIG. 5E, the rear HEGO traces are indicating a lean condition, i.e.

towards the zero voltage side (at approximately 0.05 v), when compared with the traces in FIGS. 3E and 4E. Thus, as the voltage of the rear HEGO sensor decreases, the leak gets greater in flow magnitude.

Referring to FIGS. 3, 4, and 5, the various engine operating parameters shown in traces A, B, C, D, E, F, G, and H are discussed in greater detail.

Vehicle Speed (A):

The vehicle speed is indicated in each figure. The speed is normalized between 0 and 60 miles per hour.

Engine RPM (B):

The engine RPM (revolutions per minute) is indicated in each figure. The engine speed is normalized between 0 and 5000 revolutions per minute.

A/F Ratio (C):

The air/fuel (A/F) ratio is the actual ratio of air mass vs. fuel mass. Stoichiometry for pump gas is approximately 14.64 (A/F ratio). The A/F ratio is normalized between 0 and 29.

Lambsel (D):

Lambsel is a calculated ratio of the desired air/fuel ratio divided by the stoichiometry of the fuel. An electronic engine control processor calculates this ratio based on feedback from the front and rear Heated Exhaust Gas Oxygen (HEG0) sensors. A lambsel value of 0.5 would indicate a stoichiometric air/fuel mixture. The Lambsel value is normalized between 0 and 1.

Rear Left/Right HEGO (E & F):

The rear HEGO traces are the output voltage signals from the sensors. The output signal is 0 to 1 volts and is respectively normalized in Figures E and F. A value in the range of about 0.3 to about 0.7 volts indicates an approximate stoichiometric air/fuel mixture. A value below of about 0.3 volts indicates a lean air/fuel mixture. A value above of about 0.7 volts indicates a rich air/fuel mixture. The rear HEGO sensors are located downstream of the catalyst system.

Front Left/Right HEGO (G & H)

The front HEGO sensors operate the same manner as the rear HEGO sensors. The front HEGO sensors are located upstream of the catalyst system. The sensors monitor the oxygen content in the engine's exhaust. Based on the exhaust's oxygen content, the HEGO will switch towards zero volts if the air/fuel ratio is lean of stoichiometry, or towards one volt if the air/fuel ratio is rich of stoichiometry. The front HEGO sensors switch more rapidly than the rear HEGO sensors.

Various modifications and variations will no doubt occur to those skilled in the arts to which this invention pertains. For example, the particular constants for determining a leak and the actions taken upon the determination of a leak, may be varied from that disclosed herein. These and all other variations which basically rely on the teachings through which this disclosure has advanced the art are properly considered within the scope of this invention.

What is claimed:

1. A method for detecting an exhaust leak in an engine control system having an exhaust gas oxygen sensor upstream of a catalyst and an exhaust gas oxygen sensor downstream of the catalyst and an electronic engine control system for operating an internal combustion engine, including the steps of:

monitoring the output voltage signals from the exhaust gas oxygen sensor downstream of the catalyst;

computing the average output voltages from the exhaust gas oxygen sensor downstream of the catalyst;

comparing the computed average with respect to a calibrated constant;

if the average is smaller than the constant, setting a code indicating an exhaust leak; and monitoring the output voltage signals from the exhaust gas oxygen sensor upstream of the catalyst determining a leak condition if the upstream exhaust gas oxygen sensor switches rapidly at idle and low engine speeds.

2. An apparatus for detecting an exhaust leak including:

an internal combustion engine having an input for receiving an air/fuel mixture and an output for passing exhaust gas;

a catalyst coupled to said engine output for processing exhaust gas passed by the engine and having an output for passing the processed exhaust gas;

a downstream exhaust gas oxygen sensor coupled to the output of said catalyst;

an electronic engine control module coupled to receive an input from said downstream exhaust gas oxygen sensor and having an output for controlling the air/fuel input to said engine input and including means for monitoring the voltage output signal of the exhaust gas oxygen sensor downstream of said catalyst, computing the average output voltages from the exhaust gas oxygen sensor downstream of the catalyst, comparing the computed average with respect to a calibrated constant, and, if the average is smaller than the constant, setting a code indicating an exhaust leak.

3. An apparatus as recited in claim 2 wherein said engine has a second exhaust gas path including:

a second output from the engine for passing exhaust gas;

a second catalyst, one catalyst connected to each of the engine outputs, and each catalyst having an output;

a second upstream exhaust gas oxygen sensor one coupled to the outputs of one of the catalysts; and said engine control module including means for detecting an exhaust leak and determining in which of the two exhaust gas paths a leak is located.

4. An apparatus as recited in claim 2 further comprising:

an upstream exhaust gas oxygen sensor exposed to exhaust gas flow between said engine and said catalyst; and wherein said electronic engine control module is coupled to receive an input from said upstream exhaust gas oxygen sensor and monitors the output voltage signal of the upstream exhaust gas oxygen sensor and determining a leak condition if the upstream exhaust gas oxygen sensor switches rapidly at idle and low engine speeds.

* * * * *